US012670077B2

(12) United States Patent
Song et al.

(10) Patent No.: US 12,670,077 B2
(45) Date of Patent: Jun. 30, 2026

(54) APPARATUS AND METHOD WITH SYSTEM ERROR PREDICTION

(71) Applicants:SAMSUNG ELECTRONICS CO., LTD., Suwon-si (KR); Korea University Research and Business Foundation, Seoul (KR)

(72) Inventors: Uiseok Song, Suwon-si (KR); Seoung Bum Kim, Seoul (KR); Jaehoon Kim, Seoul (KR); Byungwoo Bang, Suwon-si (KR); Junyeon Lee, Suwon-si (KR); Jiyoon Lee, Uijeongbu-si (KR); Yoon Sang Cho, Gongju-si (KR); Hansam Cho, Seoul (KR); Minkyu Kim, Seoul (KR); Hun Seong Choi, Suwon-si (KR)

(73) Assignees: Samsung Electronics Co., Ltd., Suwon-si (KR); Korea University Research and Business Foundation, Seoul (KR)

( * ) Notice: Subject to any disclaimer, the term of this patent is extended or adjusted under 35 U.S.C. 154(b) by 19 days.

(21) Appl. No.: 18/339,303

(22) Filed: Jun. 22, 2023

(65) Prior Publication Data

US 2024/0143463 A1 May 2, 2024

(30) Foreign Application Priority Data

Oct. 31, 2022 (KR) ........................ 10-2022-0143081

(51) Int. Cl.
*G06F 11/22* (2006.01)
*G06F 11/07* (2006.01)

(52) U.S. Cl.
CPC ...... *G06F 11/2263* (2013.01); *G06F 11/0751* (2013.01); *G06F 11/0769* (2013.01); *G06F 11/0793* (2013.01)

(58) Field of Classification Search
CPC ............. G06F 11/0751; G06F 11/0769; G06F 11/0793; G06F 11/2263
See application file for complete search history.

(56) References Cited

U.S. PATENT DOCUMENTS

| | | | | |
|---|---|---|---|---|
| 2020/0126037 A1* | 4/2020 | Tatituri | .................. | G06N 20/00 |
| 2021/0357282 A1* | 11/2021 | Verma | .................... | G06N 3/044 |

(Continued)

FOREIGN PATENT DOCUMENTS

| | | |
|---|---|---|
| EP | 3 979 080 A1 | 4/2022 |
| KR | 10-1856170 B1 | 5/2018 |

(Continued)

OTHER PUBLICATIONS

Das et al., "Failure Prediction by Utilizing Log Analysis: A Systematic Mapping Study", RACS '20, Oct. 13-16, 2020, Association for Computing Machinery, pp. 188-195 (Year: 2020).*

(Continued)

*Primary Examiner* — Michael Maskulinski
(74) *Attorney, Agent, or Firm* — NSIP Law

(57) ABSTRACT

An apparatus includes a processor configured to execute instructions, and a memory storing the instructions, which when executed by the processor configure the processor to generate system error prediction data using an error prediction neural network provided with one of a plurality of log data sequences generated by pre-processing a plurality of log data pieces of component log data of a system. The system error prediction data comprises information of a plurality of system errors occurring at a plurality of respective timepoints.

20 Claims, 11 Drawing Sheets

(56) References Cited

U.S. PATENT DOCUMENTS

| | | | | |
|---|---|---|---|---|
| 2023/0376970 | A1* | 11/2023 | Henryson | G06F 40/166 |
| 2024/0168872 | A1* | 5/2024 | Siddaraju | G06F 11/3698 |
| 2024/0320111 | A1* | 9/2024 | Song | G06F 11/2257 |

FOREIGN PATENT DOCUMENTS

| | | |
|---|---|---|
| KR | 10-2295868 B1 | 9/2021 |
| KR | 10-2367409 B1 | 2/2022 |
| KR | 10-2022-0078243 A | 6/2022 |

OTHER PUBLICATIONS

Yazici et al., "Orderless Recurrent Models for Multi-label Classification", 2020 IEEE/CVF Conference on Computer Vision and Pattern Recognition (CVPR), 2020, pp. 13437-13446 (Year: 2020).*

Agatonovic-Kustrin et al., "Basic concepts of artificial neural network (ANN) modeling and its application in pharmaceutical research." Journal of pharmaceutical and biomedical analysis 22.5 (2000): 717-727. (Year: 2000).*

Askarzadeh et al., "Artificial neural network training using a new efficient optimization algorithm." Applied Soft Computing 13.2 (2013): 1206-1213. (Year: 2013).*

Nawi et al., "The effect of data pre-processing on optimized training of artificial neural networks." Procedia Technology 11 (2013): 32-39. (Year: 2013).*

Neuneier et al., "How to train neural networks." Neural networks: tricks of the trade. Berlin, Heidelberg: Springer Berlin Heidelberg, 2002. 373-423. (Year: 2002).*

Liu et al., "The Emerging Trends of Multi-Label Learning," Nov. 1, 2022, IEEE Transactions on Pattern Analysis and Machine Intelligence, vol. 44, No. 11, pp. 7955-7974 (Year: 2022).*

"What is data labeling?", IBM Think Topics, Sep. 28, 2021, https://www.ibm.com/think/topics/data-labeling (Year: 2021).*

L. Zhang et al., "A DNN-Ensemble Method for Error Reduction and Training Data Selection in DNN Based Modeling," 2022 IEEE International Symposium on Electromagnetic Compatibility & Signal/ Power Integrity (EMCSI), Spokane, WA, USA, 2022, pp. 175-180 (Year: 2022).*

Bhanage et al., "IT Infrastructure Anomaly Detection and Failure Handling: A Systematic Literature Review Focusing on Datasets, Log Preprocessing, Machine & Deep Learning Approaches and Automated Tool," 2021, in IEEE Access, vol. 9, pp. 156392-156421 (Year: 2021).*

He et al., 2021, "A Survey on Automated Log Analysis for Reliability Engineering", ACM Comput. Surv. 54, 6, Article 130, 37 pages (Year: 2021).*

Chen, Zhuangbin, et al. "Experience report: Deep learning-based system log analysis for anomaly detection", 2021, arXiv preprint arXiv:2107.05908 (Year: 2021).*

Wang et al., "LogOnline: A Semi-Supervised Log-Based Anomaly Detector Aided with Online Learning Mechanism," 2023, 38th IEEE/ACM International Conference on Automated Software Engineering (ASE), Luxembourg, Luxembourg, pp. 141-152 (Year: 2023).*

Extended European search report issued on Jan. 1, 2024, in counterpart European Patent Application No. 23189462.7 (7 pages).

Rodrigo, Joaquín Amat, and Javier Escobar Ortiz. "Skforecast: time series forecasting with Python and Scikit-learn." Online: https:// cienciadedatos. net/documentos/py27-time-series-forecasting-python-scikitlearn.html Feb. 2021. (pp. 1-60).

* cited by examiner

| Time (sec) | Input data (X) |
|------------|----------------|
| 0.0 | Starting system 2 activity accounting tool |
| 0.0 | Starting system 3 activity accounting tool |
| 0.0 | Starting system 4 activity accounting tool |
| 0.0 | Starting system 5 activity accounting tool |
| 1.0 | Removed session |
| 1.0 | The session for root from using RACADM is logged off |
| ⋮ | ⋮ |

301

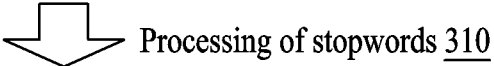 Processing of stopwords 310

| Time (sec) | Input data (X) |
|------------|----------------|
| 0.0 | Starting system activity accounting tool |
| 0.0 | Starting system activity accounting tool |
| 0.0 | Starting system activity accounting tool |
| 0.0 | Starting system activity accounting tool |
| 1.0 | Removed session |
| 1.0 | The session for root from using RACADM is logged off |
| ⋮ | ⋮ |

302

Elimination of log data at same timepoint
and having same meaning 320

| Time (sec) | Input data (X) |
|------------|----------------|
| 0.0 | Starting system activity accounting tool |
| 1.0 | Removed session |
| 1.0 | The session for root from using RACADM is logged off |
| ⋮ | ⋮ |

| Time (sec) | Input data (X) |
|---|---|
| 0.0 | Log message 1 |
| 0.0 | Log message 2 |
| 1.0 | Log message 3 |
| 1.0 | Log message 4 |
| 2.0 | Log message 5 |
| 3.0 | Log message 6 |
| 3.0 | Log message 7 |
| 4.0 | Log message 8 |
| 4.0 | Log message 9 |
| 4.0 | Log message 10 |
| 7.0 | Log message 11 |
| 9.0 | Log message 12 |
| 15.0 | Log message 13 |
| 21.0 | Log message 14 |
| 21.0 | Log message 15 |
| 30.0 | Log message 16 |
| 45.0 | Log message 17 |
| 46.0 | Log message 18 |
| 47.0 | Log message 19 |
| 53.0 | Log message 20 |

$x_k$

Network failure 501

Storage failure 502

Search time

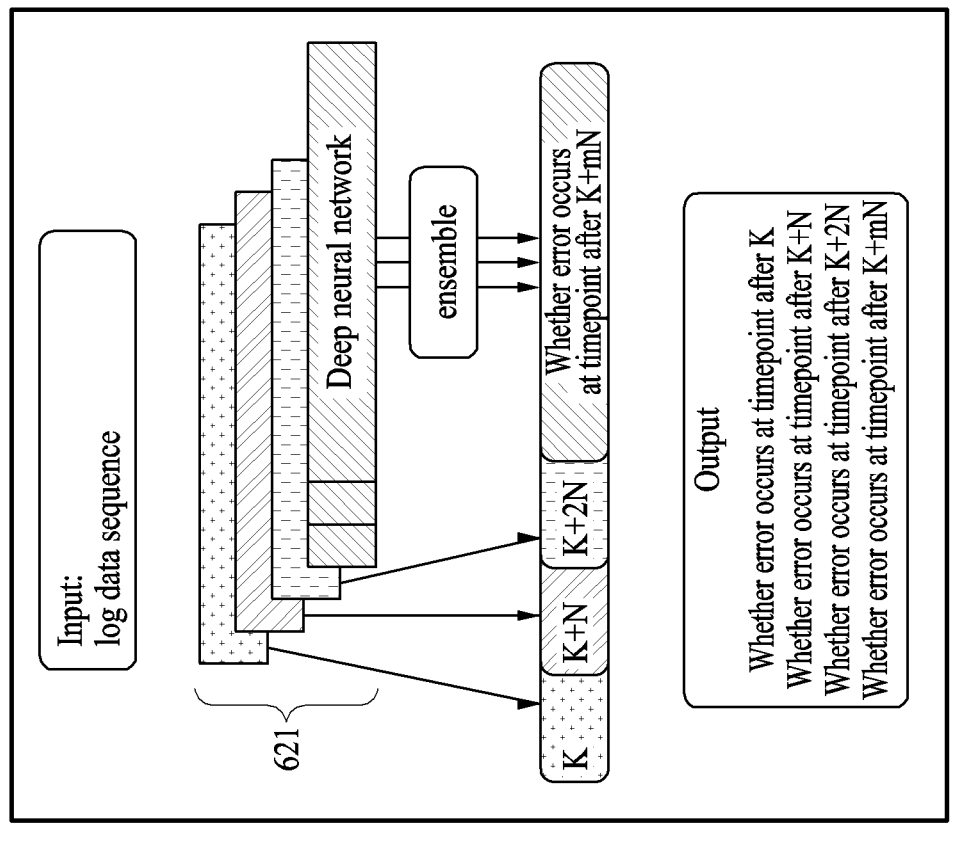
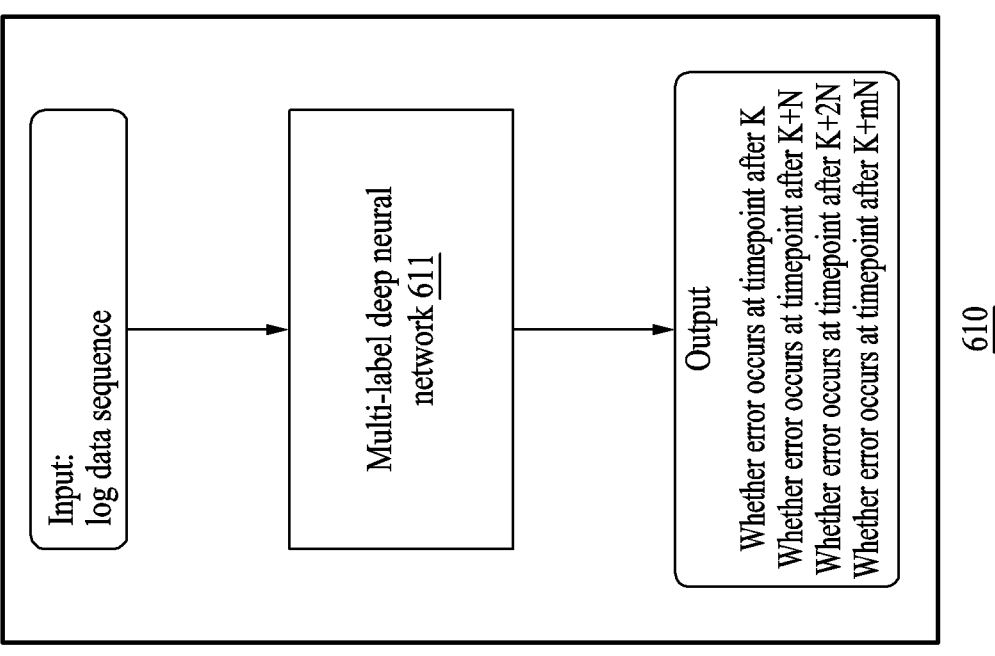
FIG. 6

APPARATUS AND METHOD WITH SYSTEM ERROR PREDICTION

CROSS-REFERENCE TO RELATED APPLICATIONS

This application claims the benefit under 35 USC § 119(a) of Korean Patent Application No. 10-2022-0143081, filed on Oct. 31, 2022, in the Korean Intellectual Property Office, the entire disclosure of which is incorporated herein by reference for all purposes.

BACKGROUND

1. Field

The following description relates to an apparatus and a method with system error prediction.

2. Description of Related Art

With the advancement of computing systems, the number of components included in a computing system is increasing. Each component generates log data, which may contain information of operations executed by the component. Log data may be used to track and analyze system activities as a criterion for determining an error that may occur in a computer system.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one or more general aspects, an apparatus may include a processor configured to execute instructions, and a memory storing the instructions, which when executed by the processor configure the processor to generate system error prediction data using an error prediction neural network provided with one of a plurality of log data sequences generated by pre-processing a plurality of log data pieces of component log data of a system, wherein the system error prediction data may include information of a plurality of system errors occurring at a plurality of respective timepoints.

The information of the plurality of system errors may include at least one of a predicted timepoint of error occurrence, a type of system error, and a possibility of error occurrence.

The execution of the instruction may configure the processor to: sequentially receive the log data of a system to obtain a plurality of log data pieces; and perform the pre-processing of the plurality of log data pieces, including eliminating redundant log data pieces from the plurality of log data pieces; and grouping a plurality of log data pieces, from which the redundant log data pieces are eliminated, to generate the plurality of log data sequences according to a predetermined sequence size.

The eliminating of the redundant log data pieces may include eliminating stopwords included in the plurality of log data pieces; and eliminating repeating log data pieces from a plurality of log data pieces from which the stopwords are eliminated.

The execution of the instructions may configure the processor to train the error prediction neural network based on training data in which a plurality of system errors are labeled in a single log data sequence.

The plurality of system errors may include a plurality of system errors with different error lead times.

The error prediction neural network may include a multi-label deep neural network.

The error prediction neural network may include a plurality of deep neural networks.

The execution of the instructions may configure the processor to generate an error handling report based on the system error prediction data.

The generating of the error handling report may include outputting an integrated error handling report when there is a mutually associative relationship between the plurality of system errors included in the system error prediction data.

The generating of the error handling report may include generating a plurality of error handling reports respectively corresponding to the plurality of system errors in response to the plurality of system errors included in the system error prediction data being independent.

The generating of the error handling report may include outputting an error prevention report in response to a possibility of an occurrence of a plurality of mutually associated system errors included in the system error prediction data being less than a threshold value.

In one or more general aspects, a processor-implemented method may include eliminating redundant log data pieces from a plurality of log data pieces; grouping a plurality of log data pieces, from which the redundant log data pieces are eliminated, to generate a plurality of log data sequences according to a predetermined sequence size; labeling a plurality of system errors in the plurality of log data sequences; and training an error prediction neural network using the labeled plurality of system errors.

The labeled plurality of system errors may include different error lead times.

Each of the labeled plurality of system errors may include at least one of an error-occurrence timepoint and a type of system error.

The eliminating of the redundant log data pieces may include eliminating stopwords included in the plurality of log data pieces; and eliminating repeating log data pieces from a plurality of log data pieces from which the stopwords are eliminated.

In another general aspect, a computing system may include a processor configured to execute instructions, and a memory storing the instructions, which when executed by the processor configure the processor to sequentially receive log data of a system to obtain a plurality of log data pieces; pre-process the plurality of log data pieces to obtain a plurality of log data sequences; and generate system error prediction data using an error prediction neural network provided one of the plurality of log data sequences, wherein a size of the system error prediction data may vary according to a size of a log data sequence.

The number of errors included in the system error prediction data may vary according to an increase and a decrease of the number of log data pieces included in a log data sequence.

The system error prediction data may include information of a plurality of system errors occurring at a plurality of respective timepoints.

The information of each system error may include at least one of a predicted timepoint of error occurrence, a type of system error, and a possibility of error occurrence.

Other features and aspects will be apparent from the following detailed description, the drawings, and the claims.

BRIEF DESCRIPTION OF THE DRAWINGS

FIGS. 3 to 5 illustrate an example method of generating training data of a neural network according to one or more embodiments.

FIG. 6 illustrates examples of implementing a neural network according to one or more embodiments.

Figure 1A:
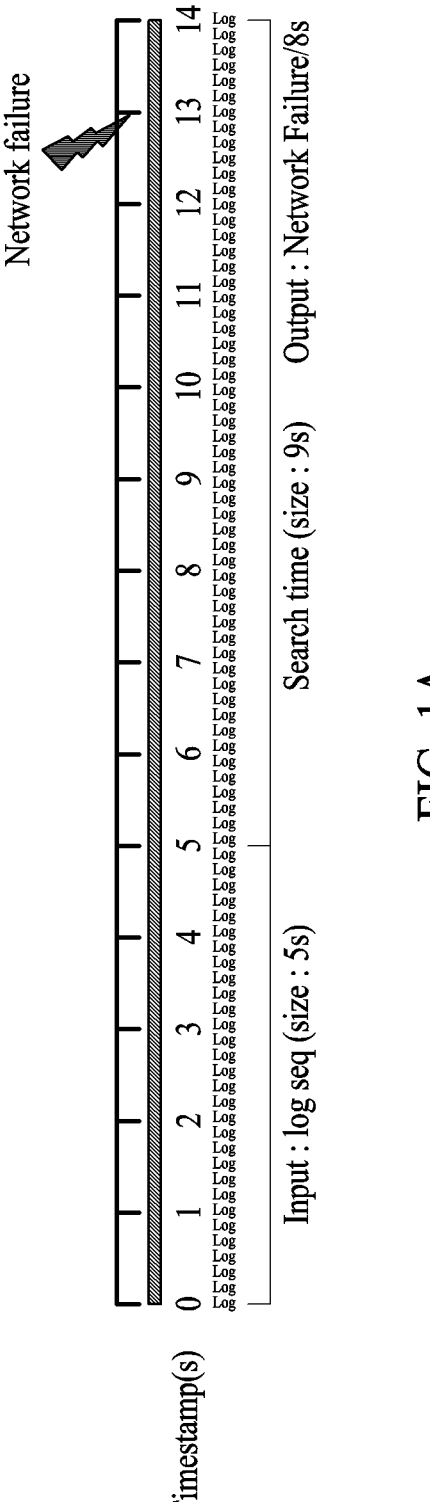
FIGS. 1A and 1B illustrate an example system error prediction method based on log data of a system component according to one or more embodiments.

Throughout the drawings and the detailed description, unless otherwise described or provided, the same drawing reference numerals may be understood to refer to the same or like elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for describing various examples only and is not to be used to limit the disclosure. The articles "a," "an," and "the" are intended to include the plural forms as well, unless the context clearly indicates otherwise. As non-limiting examples, terms "comprise" or "comprises," "include" or "includes," and "have" or "has" specify the presence of stated features, numbers, operations, members, elements, and/or combinations thereof, but do not preclude the presence or addition of one or more other features, numbers, operations, members, elements, and/or combinations thereof, or the alternate presence of an alternative stated features, numbers, operations, members, elements, and/or combinations thereof. Additionally, while one embodiment may set forth such terms "comprise" or "comprises," "include" or "includes," and "have" or "has" specify the presence of stated features, numbers, operations, members, elements, and/or combinations thereof, other embodiments may exist where one or more of the stated features, numbers, operations, members, elements, and/or combinations thereof are not present.

As used herein, the term "and/or" includes any one and any combination of any two or more of the associated listed items. The phrases "at least one of A, B, and C", "at least one of A, B, or C", and the like are intended to have disjunctive meanings, and these phrases "at least one of A, B, and C", "at least one of A, B, or C", and the like also include examples where there may be one or more of each of A, B, and/or C (e.g., any combination of one or more of each of A, B, and C), unless the corresponding description and embodiment necessitates such listings (e.g., "at least one of A, B, and C") to be interpreted to have a conjunctive meaning.

As used in connection with various example embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to one embodiment, the module may be implemented in a form of an application-predetermined integrated circuit (ASIC).

As used herein, the term "-unit" refers to a software or hardware component such as a field-programmable gate array (FPGA) or an application-specific integrated circuit (ASIC) and the "-unit" performs predefined functions. However, the "-unit" is not limited to software or hardware. The "-unit" may be configured to be on an addressable storage medium or configured to operate one or more processors. For example, the "-unit" may include components such as software components, object-oriented software components, class components, and task components, processes, functions, attributes, procedures, subroutines, segments of program code, drivers, firmware, microcode, circuits, data, database, data structures, tables, arrays, and variables. The functionality provided by the components and the "-unit" may be combined into fewer components and "-units" or further separated into additional components and "-units". In addition, components and "-units" may be implemented to play one or more central processing units (CPU) in a device or secure multimedia card. The "-unit" may include one or more processors.

Throughout the specification, when a component or element is described as being "connected to," "coupled to," or "joined to" another component or element, it may be directly "connected to," "coupled to," or "joined to" the other component or element, or there may reasonably be one or more other components or elements intervening therebetween. When a component or element is described as being "directly connected to," "directly coupled to," or "directly joined to" another component or element, there can be no other elements intervening therebetween. Likewise, expressions, for example, "between" and "immediately between" and "adjacent to" and "immediately adjacent to" may also be construed as described in the foregoing.

Although terms such as "first," "second," and "third", or A, B, (a), (b), and the like may be used herein to describe various members, components, regions, layers, or sections, these members, components, regions, layers, or sections are not to be limited by these terms. Each of these terminologies is not used to define an essence, order, or sequence of corresponding members, components, regions, layers, or sections, for example, but used merely to distinguish the corresponding members, components, regions, layers, or sections from other members, components, regions, layers, or sections. Thus, a first member, component, region, layer, or section referred to in the examples described herein may also be referred to as a second member, component, region, layer, or section without departing from the teachings of the examples.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application and are not to be interpreted in an idealized or overly formal sense unless expressly so defined herein. The use of the term "may" herein with respect to an example or embodiment, e.g., as to what an example or embodiment may include or implement, means that at least one example or embodiment exists where such a feature is included or implemented, while all examples are not limited thereto.

Figure 1B:
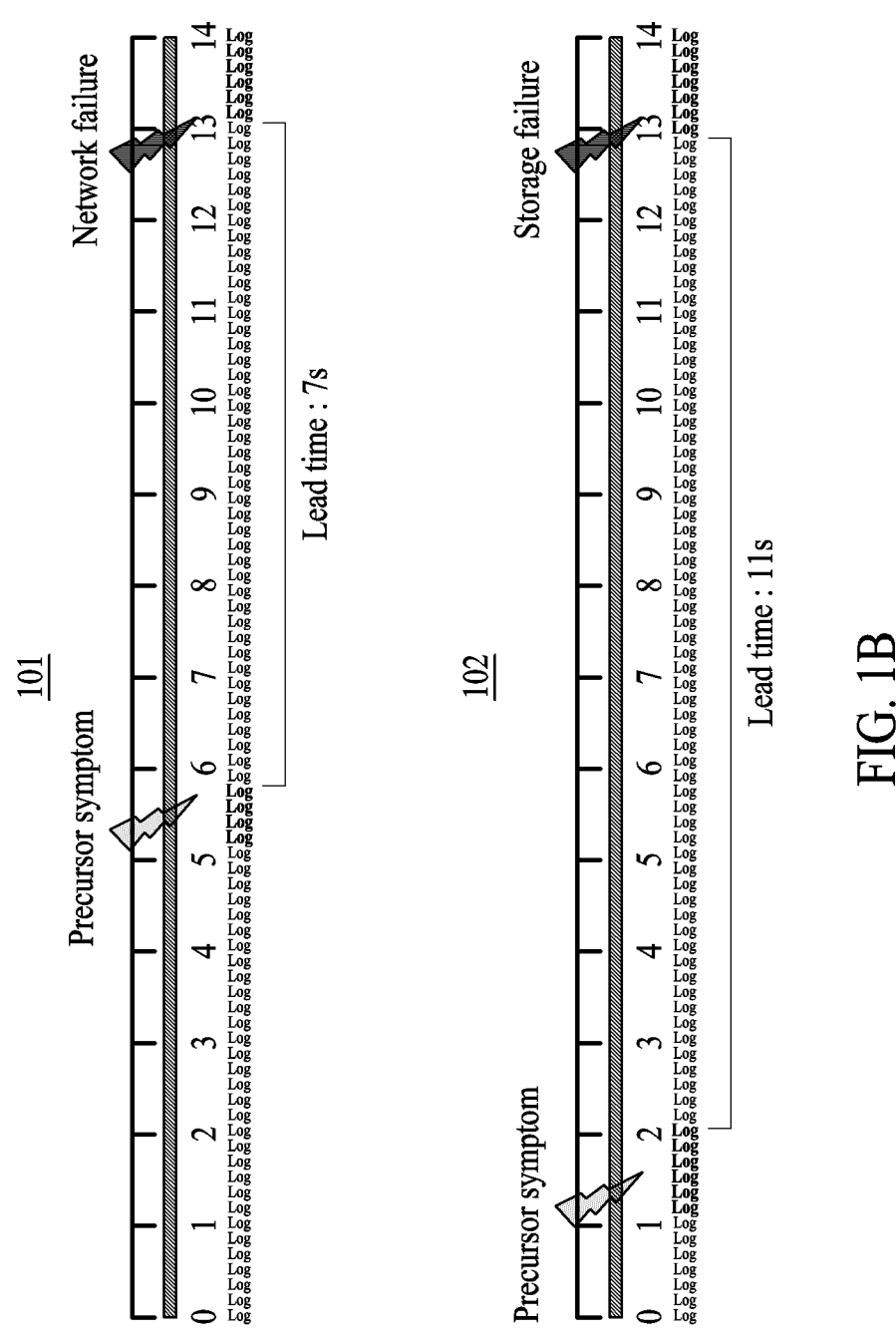

FIGS. 1A and 1B illustrate an example system error prediction method based on log data of a system according to one or more embodiments.

With the advancement of computing systems such as a supercomputer, a cloud system, a data center and the like, each computing system may include numerous components such as a solid state drive (SSD), a graphics processing unit (GPU), a network switch and the like. With the increase in the number of these components, an error rate of an entire system may be also increasing. Log data is typically generated in many system components.

FIG. 1A illustrates an example log data generated in a system component. The log data may include a log data sequence as an input and a network failure data as an output. As illustrated, input of the log data sequence includes system log data generated for 5 seconds, and the output indication of the network failure occurring 8 seconds after the input within a search time (9 seconds).

FIG. 1B illustrates two situations in which precursor symptom for each system error may occur at a different timepoint of log data. The precursor symptom may indicate an error possibility or potential of log data. In a first situation 101, a network error may occur 7 seconds after a first precursor symptom occurs. In other words, error lead time of a network error in this example may be 7 seconds. In a second situation 102, a storage failure (error) may occur 11 seconds after a second precursor symptom occurs. In other words, error lead time of a storage error may be 11 seconds in this example. Thus, it is found desirable to develop a technology that is capable of performing accurate and efficient prediction of system errors having different error lead times.

Figure 2:
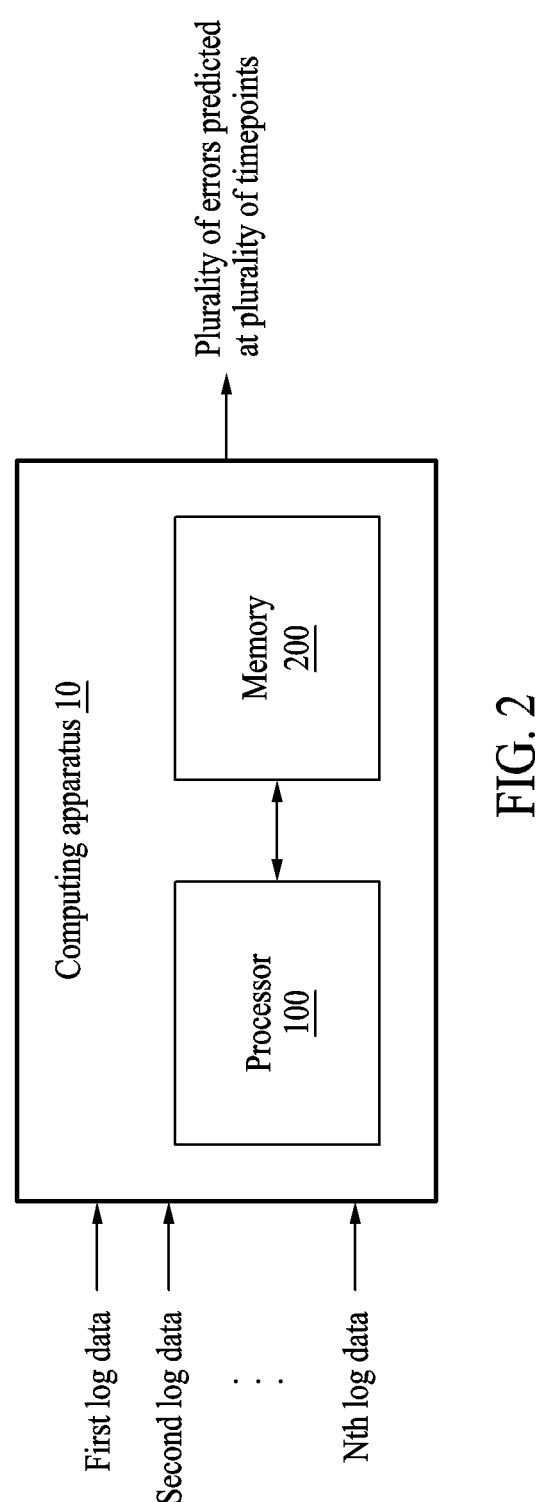
FIG. 2 illustrates an example apparatus with system error protection according to one or more embodiments.

FIG. 2 illustrates an example computing apparatus according to one or more embodiments.

Referring to FIG. 2, a computing apparatus (device or system) 10 may be configured to predict a plurality of system errors that may occur at different timepoints based on a plurality of log data pieces, respectively. The plurality of log data pieces may include first log data through $n^{th}$ log data (n is an integer).

The error prediction apparatus 10 may be configured to obtain a plurality of error prediction results. Each error prediction result may include respective first information of one or more system errors that may occur at a corresponding timepoint and respective second information of the one or more system errors that may each include corresponding error lead times based on a single log data sequence. The error lead times of the system errors may be different from each other, or some of the error lead times may be the same. The single log data sequence may be one of a plurality of log data sequences derived from the plurality of log data pieces. The error prediction apparatus 10 may be configured to use the plurality of error prediction results to perform a timely response to the system errors occurring at the respective timepoints of the respective log data pieces.

The computing apparatus 10 may be configured to predict a system error by using a neural network. A neural network may include a model having a problem-solving ability implemented through nodes forming a network through weighted connections, a strength of which changes through learning.

The neural network may include one or more layers, each including one or more nodes connected to other nodes through weighted connection. The neural network may infer a result from a training input by adjusting the connecting weight through training.

The neural networks may include, but are not limited to, a deep neural network (DNN), a convolutional neural network (CNN), a recurrent neural network (RNN), a perceptron, a multilayer perceptron, a feed forward (FF), a radial basis function network (RBFN), a deep feed forward (DFF), a long short-term memory (LSTM), a gated recurrent unit (GRU), an auto encoder (AE), a variational auto encoder (VAE), a denoising auto encoder (DAE), a sparse auto encoder (SAE), a Markov chain (MC), a Hopfield network (HN), a Boltzmann machine (BM), a restricted Boltzmann machine (RBM), a deep belief network (DBN), a deep convolutional network (DCN), a deconvolutional network (DN), a deep convolutional inverse graphics network (DCIGN), a generative adversarial network (GAN), a liquid state machine (LSM), an extreme learning machine (ELM), an echo state network (ESN), a deep residual network (DRN), a differentiable neural computer (DNC), a neural turning machine (NTM), a capsule network (CN), a Kohonen network (KN), and an attention network (AN).

The error prediction apparatus 10 may be configured to reduce the amount of calculations for training and/or utilization of a neural network by using a multi-label DNN. The error prediction apparatus 10 may be configured to perform an accurate error prediction by utilizing ensemble data in which outputs of a plurality of DNNs are combined. While examples have been described with respect to neural networks, embodiments are not limited to the same as examples are also applicable to other machine learning models.

The error prediction apparatus 10 may be, or implemented in, a personal computer (PC), a data server, a portable device, or any other suitable electronic devices.

The portable device may be a laptop computer, a mobile phone, a smart phone, a tablet PC, a mobile internet device (MID), a personal digital assistant (PDA), an enterprise digital assistant (EDA), a digital still camera, a digital video camera, a portable multimedia player (PMP), a personal navigation device or portable navigation device (PND), a handheld game console, an e-book, a smart device, or the like. The smart device may include, but is not limited to, a smart watch, a smart band, or a smart ring.

In one example, as shown in FIG. 2, the computing apparatus 10 may include a processor 100 and a memory 200.

The processor 100 may be configured to process data stored in the memory 200. The processor 100 may be configured to execute computer-readable medium storing instructions stored in the memory 200, which upon execution by the processor configure the processor to perform one or more or any combination of operations or methods described herein.

The processor 100 may be a data processing device implemented by hardware including a circuit having a physical structure to perform any suitable operations. In one example, the suitable operations may include code or instructions in a program.

In one example, the hardware-implemented data processing device may include at least one of a microprocessor, a CPU, a processor core, a multi-core processor, a multiprocessor, an ASIC, an FPGA, and the like.

When instructions are executed by the processor 100, the processor 100 may be configured to perform required operations. In one example, the processor 100 may be configured to obtain a plurality of log data pieces by sequentially receiving log data of a system. The plurality of log data pieces may include respective identifiable system errors that may be different depending on the log data. Log data may include, but are not limited to, numbers and/or text, time information, a log message, a log type, a log identification (ID) number, and/or a log category value, as non-limiting examples.

The processor 100 may be configured to obtain a plurality of log data sequences by preprocessing a plurality of log data pieces. A neural network further described below may be configured to predict a system error based on an order of log data pieces included in a log data sequence. In order to efficiently use information of an order of log data pieces, the processor 100 may preprocess a plurality of log data pieces.

The processor 100 may be configured to eliminate stopwords included in a plurality of log data pieces. The processor 100 may be configured to eliminate repeating log data pieces from a plurality of log data pieces from which the stopwords are eliminated. That is, the processor 100 may be configured to remove redundant log data pieces from a plurality of log data pieces.

The processor 100 may be configured to group a plurality of log data pieces, from which the redundant log data pieces are eliminated, to obtain a plurality of log data sequences according to a predetermined sequence size, for example.

The processor 100 may be configured to obtain system error prediction data by inputting one of a plurality of log data sequences (e.g., pre-processed data) to a neural network. Error prediction data may include information of one or more system errors that may occur at respective timepoints. The information of each of the log data pieces with respect to respective system errors may include a predicted timepoint of error occurrence, a type of system error, and/or a possibility of error occurrence, for example. A size (e.g., a number of errors included in error prediction data) of error prediction data may change depending on a size (e.g., a number of log data pieces included in a log data sequence) of a log data sequence, because the size of one log data sequence may increase or decrease toward optimization of the operation of the system.

A neural network may be trained based on training data in which a plurality of system errors is labeled in a single log data sequence. The plurality of system errors may include different error lead times, respectively. Neural network training will be described in greater detail with reference to FIGS. 3 through 5.

A neural network may be implemented as a multi-label DNN. A neural network may also be implemented through a plurality of DNNs. A configuration and an operation of a neural network will be described in greater detail with reference to FIG. 6.

The processor 100 may output an error handling report based on error prediction data (e.g., information of one or more system errors that may occur at respective timepoints) output by a neural network.

The processor 100 may output an integrated error handling report when there is a mutually associative relationship between one or more system errors included in the error prediction data.

When one or more system errors included in the error prediction data are independent of each other, the processor 100 may output one or more error handling reports corresponding to one or more system errors, respectively.

As will be described in greater detail with reference to FIG. 7, the processor 100 may output an error prevention report when a possibility of an occurrence of one or more mutually associated system errors included in the error prediction data is determined to be less than a threshold value.

The memory 200 may be implemented as a volatile memory device or a non-volatile memory device.

The volatile memory device may be implemented as dynamic random-access memory (DRAM), static random-access memory (SRAM), thyristor RAM (T-RAM), zero capacitor RAM (Z-RAM), twin transistor RAM (TTRAM), or the like.

The non-volatile memory device may be implemented as electrically erasable programmable read-only memory (EE-PROM), flash memory, magnetic RAM (MRAM), spin-transfer torque (STT)-MRAM, conductive bridging RAM (CBRAM), ferroelectric RAM (FeRAM), phase change RAM (PRAM), resistive RAM (RRAM), nanotube RRAM, polymer RAM (PoRAM), nano floating gate Memory (NFGM), holographic memory, a molecular electronic memory device, insulator resistance change memory, or the like.

Figure 4:
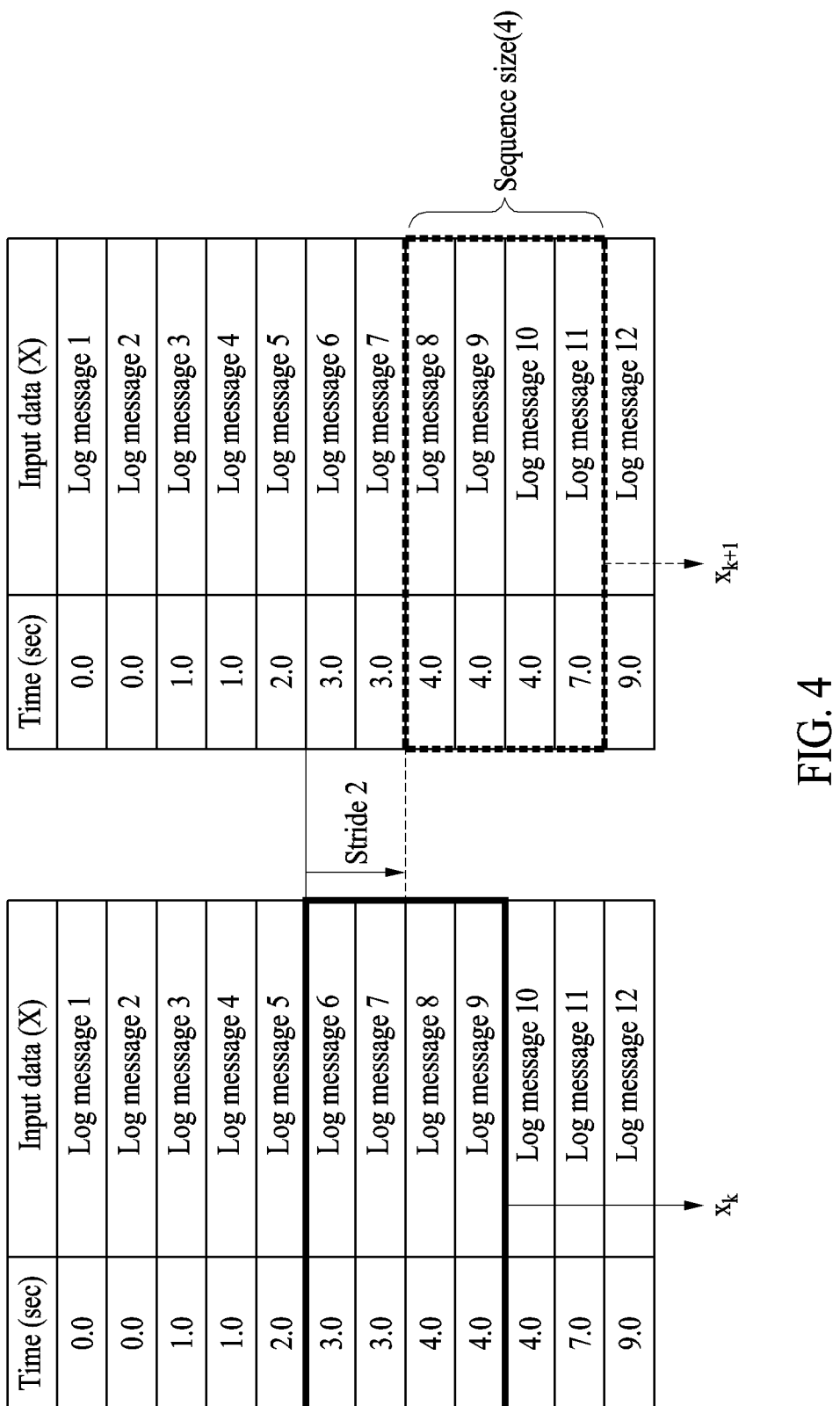
Figure 5:
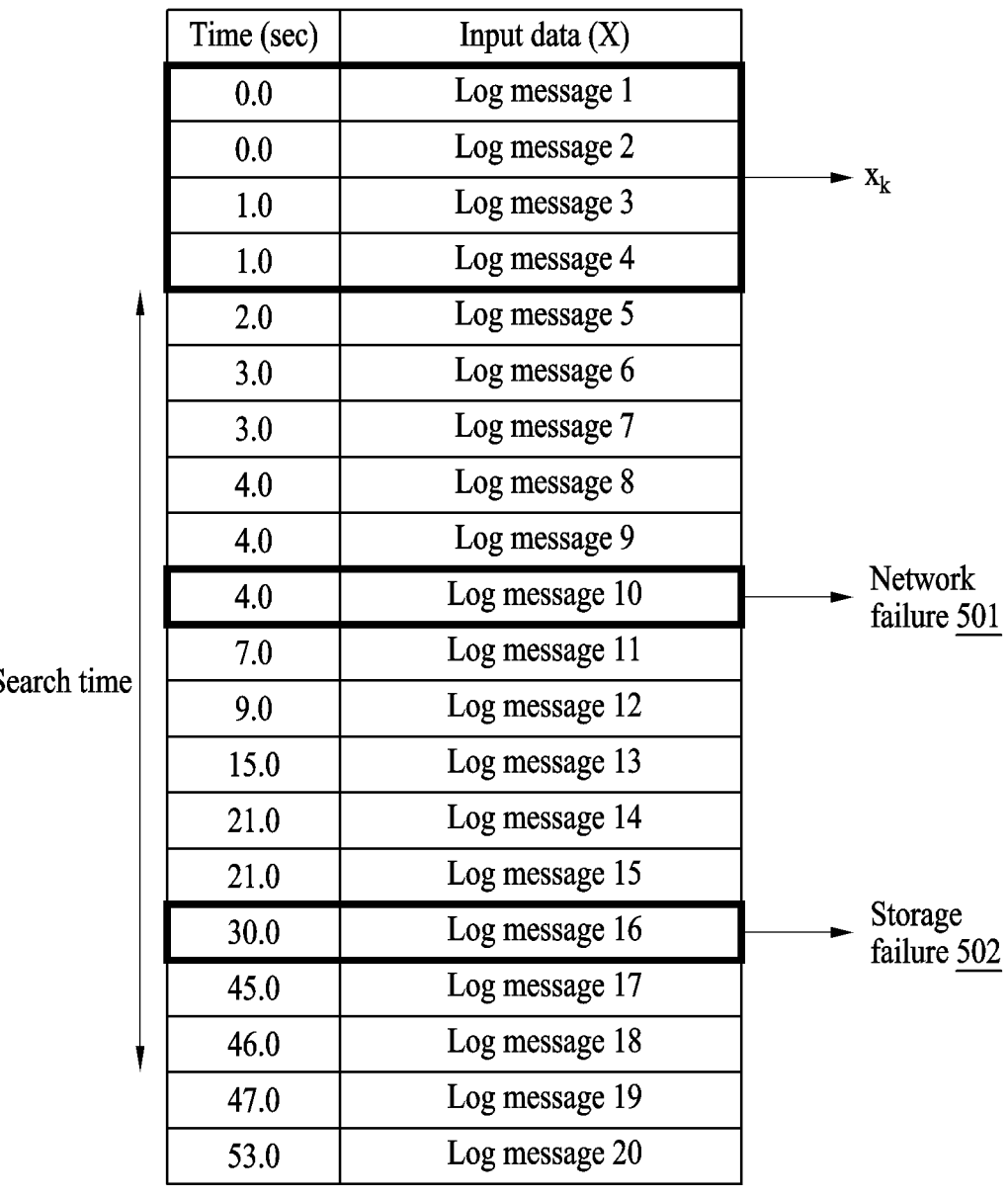

FIGS. 3 through 5 illustrate an example method of generating training data of a neural network.

FIGS. 3 through 5 show examples of log data. Log data may include, but are not limited to, numbers and/or text, time information, a log message, a log type, a log ID, and/or a log category value. Log data is not limited to the examples shown in FIGS. 3 through 5.

FIG. 3 illustrates an example operation of eliminating redundant log data pieces included in log data. When a plurality of components interact with a specific command, redundant log data pieces may be generated at a same timepoint in each one of the plurality of components. For more efficient learning, redundant log data pieces may be excluded.

According to an example, in operation 310, a processor (e.g., the processor 100 of FIG. 2) may eliminate stopwords included in log data. Stopwords may mean data without much meaning when analyzing log data including texts. Numbers 2 through 5 included in first log data piece 301 may be stopwords because they are unimportant information when analyzing log data. Second log data piece 302 may be obtained through processing stopwords by removing them (numbers 2 through 5) from the first log data piece 301.

In operation 320, the processor 100, for example, may convert the second log data piece 302, which includes repetitive information, into one single piece of log data 303. The processor 100 may convert the second log data piece 302, which includes the repetitive information occurring at a same timepoint with the same meaning, into one single piece of log data 303.

FIG. 4 illustrates an example operation of obtaining a plurality of log data sequences from a plurality of log data pieces, in order to remove redundant log data pieces. While collecting log data, log data may not be generated at every timepoint (a timepoint in a unit of seconds). The processor 100 may group a plurality of log data pieces, according to a predetermined sequence size, into a log data sequence having the predetermined size.

According to an example, the processor 100 in FIG. 2 may group a plurality of log data pieces, from which redundant log data pieces may be removed or eliminated, according to a predetermined sequence size (e.g., 4) to obtain a plurality of log data sequences having the predetermined log data sequence size of 4(e.g., xk, xk+1). The plurality of log data sequences may each be formed according to a predetermined stride value (such as a stride of 2 as shown in FIG. 4) and may include same log data. The method of preprocessing log data described with reference to FIGS. 3 and 4 may be alike a method of obtaining a log data sequence, which may be input to a trained neural network. Training data for training a neural network may be completed after a labeling process described with reference to FIG. 5.

FIG. 5 illustrates an example operation of labeling a plurality of system errors in each of a plurality of log data sequences. As described above, a timepoint at which a precursor symptom occurs may be different depending on a type of system error. The processor 100 may label a plurality of system errors 501 and 502 in each (e.g., xk) of a plurality of log data sequences. The plurality of system errors 501 and 502 may include a plurality of system errors with different error lead times, respectively.

According to an example, the number of system errors labeled on a log data sequence may differ according to a predetermined search time. For example, the number of labeled system errors may increase as a search time increases.

The number of system errors labeled on a log data sequence may differ according to the size (e.g., the number of log data pieces included in a log data sequence) of a log data sequence. For example, the number of labeled system errors may increase as the size of a log data sequence increases. Referring to Table 1, a performance of a neural network trained based on training data formed according to different conditions (e.g., the size of a log data sequence and/or a search time) is shown.

TABLE 1

| Size (Number of data pieces) | Search time (sec) | Performances | | | |
|---|---|---|---|---|---|
| | | Accuracy | Precision | Recall | F1 |
| 10 | 10 | 0.9915 | 0.1579 | 0.1364 | 0.1463 |
| | 30 | 0.9919 | 0.1538 | 0.0833 | 0.1081 |
| | 60 (1 min) | 0.9910 | 0.2609 | 0.2308 | 0.2449 |
| | 180 (3 min) | 0.9856 | 0.4478 | 0.5769 | 0.5042 |
| 20 | 10 | 0.9946 | 0.4063 | 0.3939 | 0.4000 |
| | 30 | 0.9939 | 0.3784 | 0.4000 | 0.3889 |
| | 60 (1 min) | 0.9942 | 0.2000 | 0.0556 | 0.0870 |
| | 180 (3 min) | 0.9917 | 0.6250 | 0.4167 | 0.5000 |
| 30 | 10 | 0.9897 | 0.4049 | 0.8571 | 0.5500 |
| | 30 | 0.9866 | 0.3503 | 0.8519 | 0.4964 |
| | 60 (1 min) | 0.9935 | 0.5954 | 0.8387 | 0.6964 |
| | 180 (3 min) | 0.9805 | 0.4265 | 0.7346 | 0.5397 |

Referring to Table 1, as the size of a log data sequence increases, accuracy is shown to decrease, while precision, a recall rate, and an F1 score increase. In addition, as a search time increases, accuracy is shown to decrease, while precision, a recall rate, and an F1 score change without increasing or decreasing trends.

FIG. 6 illustrates examples of implementing a neural network according to one or more embodiments.

According to an example, a neural network 610 may be implemented as a multi-label DNN 611. Based on the multi-label DNN 611, the processor 100 may be configured to obtain a plurality of outputs (e.g., information of a plurality of system errors that may each occur at a plurality of timepoints (e.g., a timepoint after K(s), a timepoint after K+N, . . . , a timepoint after K+mN)) from a single input (e.g., a single log data sequence). The processor 100 may be configured to perform a plurality of error predictions by using one multi-label DNN 611. The processor 100 may reduce the amount of calculations for training/using a neural network by using the multi-label DNN 611. The multi-label DNN 611 may be trained based on the training data described above with reference to FIGS. 3 through 5.

According to an example, a neural network 620 may be implemented through a plurality of DNNs 621. One of the DNNs 621 may output one piece of error prediction data. Each DNN may use the one piece of error prediction data to predict system errors that may occur at different timepoints. Each DNN may have different structures and/or learning methods. As the number of DNNs 621 increases, the number of predictable system errors that may be predicted may correspondingly increase.

If error-occurrence timepoints included in each piece of error prediction data are the same, each of the pieces of error prediction data may be combined and be converted to ensemble data. As the number of DNNs capable of predicting the same error-occurrence timepoint (a timepoint after K+Mn(s)) increases, the accuracy of error prediction data may increase. The processor 100 may perform an accurate error prediction by utilizing ensemble data in which outputs of the plurality of DNNs 621 are combined.

Figure 7A:
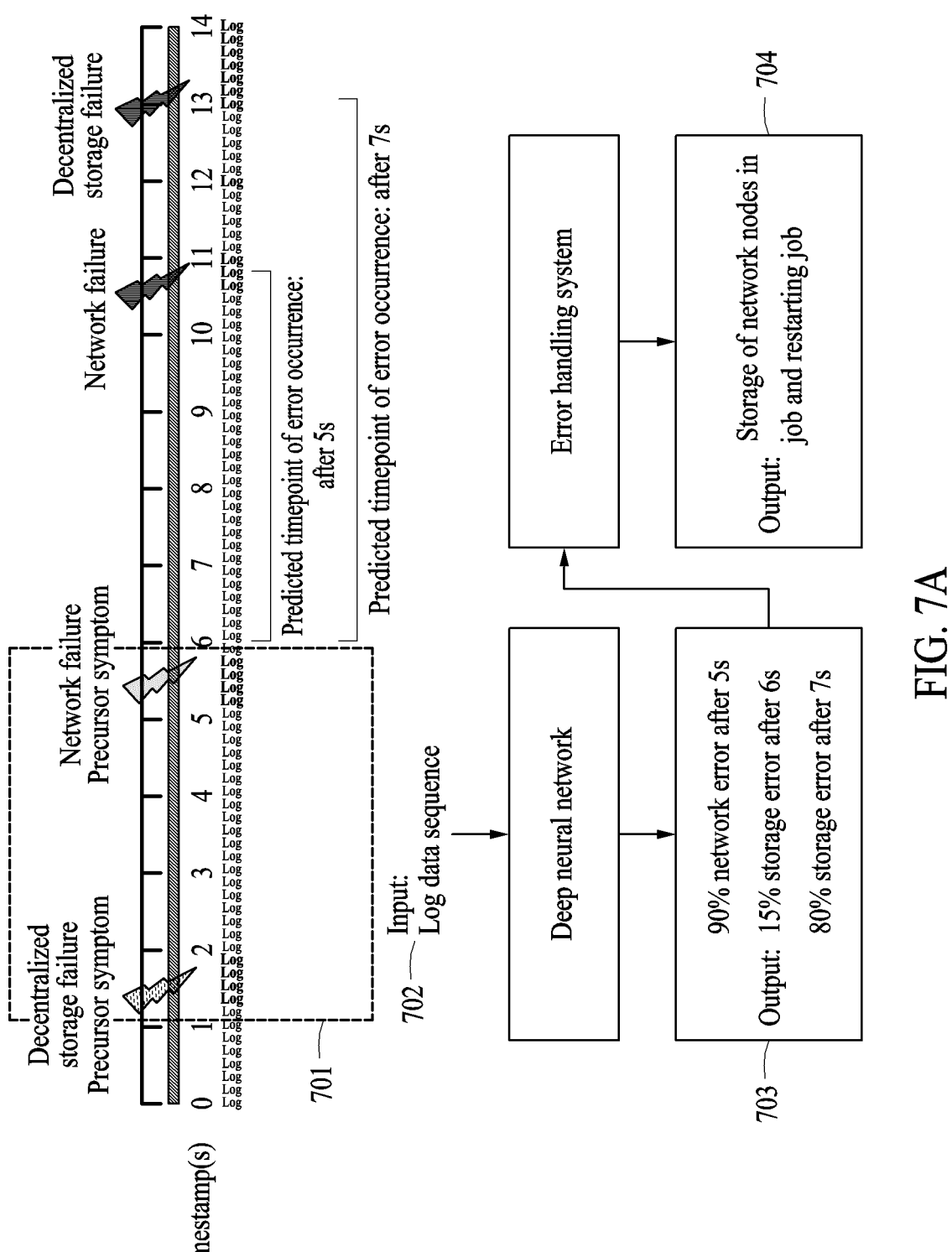
FIGS. 7A to 7C illustrate an example operation of system error prediction according to one or more embodiments.
Figure 7B:
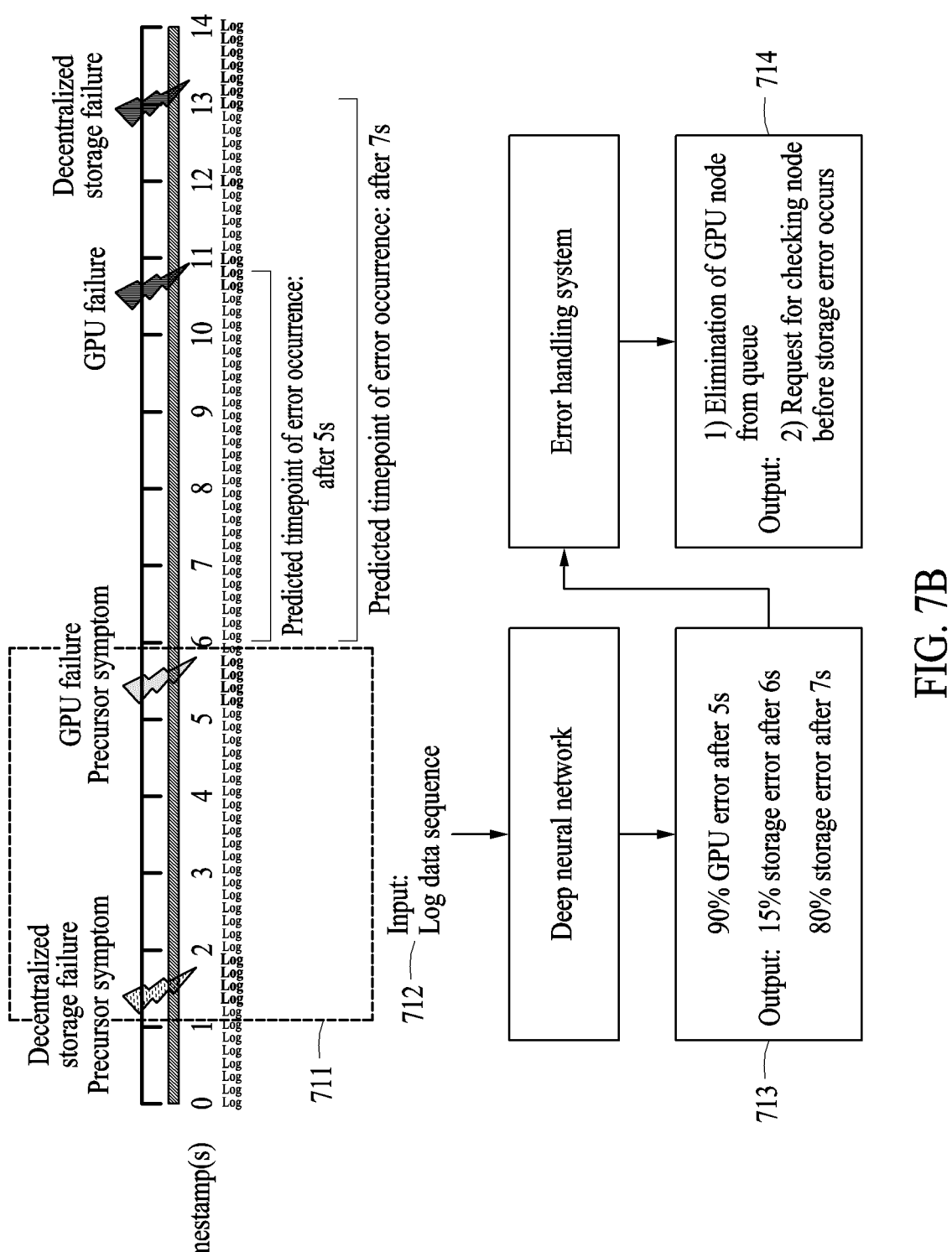
Figure 7C:
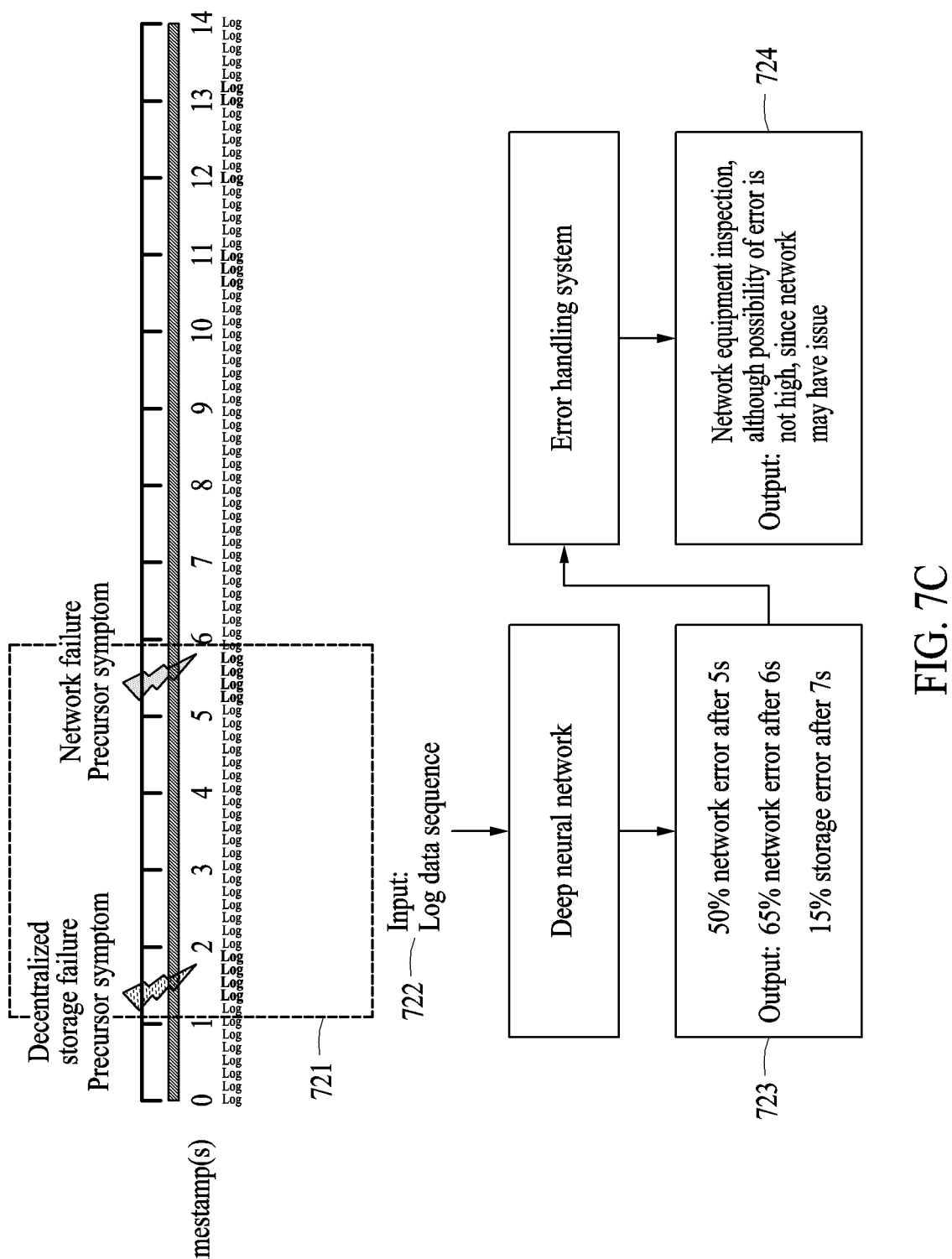

FIGS. 7A through 7C illustrate an example system error prediction according to one or more embodiments.

According to an example, a processor (e.g., the processor 100 of FIG. 2) may output an error handling report based on error prediction data. Error prediction data may include information of a plurality of system errors that may occur at a plurality of timepoints, and the error handling report generated by the example processor 100 may differ according to the error prediction data.

Referring to FIG. 7A, the processor 100 may output an integrated error handling report when there is a determined mutually associative relationship between system errors included in error prediction data. The processor 100 may input a log data sequence 702 obtained based on log data pieces 701 to a neural network (e.g., the multi-label deep neural network 611 or the plurality of deep neural networks 621 of FIG. 6). The plurality of log data pieces 701 may include a precursor symptom (e.g., log data) of a decentralized storage error and a precursor symptom of a network failure. The processor 100 may obtain error prediction data 703 from the log data sequence 702 based on the DNN. For example, the error prediction data 703 may be 90% possibility of an occurrence of a network error after 5 seconds (e.g., 5 seconds after a timepoint of a generation of the last piece of log data included in a log data sequence), 15% possibility of an occurrence of a partitioned storage error after 6 seconds, and 80% possibility of an occurrence of a partitioned storage error after 7 seconds) from the log data sequence 702 based on the DNN. The processor 100 may obtain an integrated error handling report 704 (e.g., storing network nodes in a job and restarting the job after checking the network) from the error prediction data 703. The error prediction data 703 may include system errors that have mutually associative relationships. The integrated error handling report 704 may include a preemptive handling method of a system error predicted to occur at an early timepoint from among system errors having associative relationships.

Referring to FIG. 7B, when system errors included in error prediction data are independent of each other, the example processor 100 may output a plurality of error handling reports respectively corresponding to the system errors. The processor 100 may input a log data sequence 712 obtained based on a plurality of log data pieces 711 to a neural network (e.g., the multi-label deep neural network 611 or the plurality of deep neural networks 621 of FIG. 6). The plurality of log data pieces 711 may include a precursor symptom (e.g., log data) of a partitioned storage error and a precursor symptom of a GPU error. The processor 100 may obtain error prediction data 713 from the log data sequence 712 based on the DNN. For example, the error prediction data 713 may include 90% possibility of an occurrence of a GPU error after 5 seconds (e.g., 5 seconds after a timepoint of a generation of the last piece of log data included in a log data sequence), 15% possibility of an occurrence of a partitioned storage error after 6 seconds, and 80% possibility of an occurrence of a partitioned storage error after 7 seconds. The processor 100 may obtain a plurality of error handling reports 714 from error prediction data 713 including a plurality of independent system errors. The plurality of error handling reports 714 may include elimination (and/or allocation of a job to another node and then restarting the job when a GPU node in which error is predicted is already allocated to the job) of a GPU node from a queue, checking (e.g., inspection) a node before a partitioned storage error occurs. The plurality of error handling reports 714 may include an error handling method respectively corresponding to the plurality of system errors.

Referring to FIG. 7C, the example processor 100 may output an error prevention report when the possibility of an occurrence of a plurality of mutually associated system errors included in error prediction data is less than a threshold value. The processor 100 may input a log data sequence 722 obtained based on a plurality of log data pieces 721 to a neural network (e.g., the multi-label deep neural network 611 or the plurality of deep neural networks 621 of FIG. 6). The plurality of log data pieces 721 may include a weak precursor symptom of a partitioned storage error and a weak precursor symptom of a network error. The processor 100 may obtain error prediction data 723 from the log data sequence 722 based on a DNN. For example, the error prediction data 723 may include 50% possibility of an occurrence of a network error after 5 seconds (e.g., 5 seconds after a timepoint of a generation of the last piece of log data included in a log data sequence), 65% possibility of an occurrence of a network error after 6 seconds, and 45% possibility of an occurrence of a partitioned storage error after 7 seconds. The processor 100 may obtain an error prevention report 724 (e.g., network equipment inspection) from the error prediction data 723 including a plurality of mutually associated system errors having a possibility of occurrence that is less than a threshold value (e.g., 80%).

According to an example, a computing apparatus (e.g., the system apparatus 10 in FIG. 2 may be configured to detect/predict in advance an error occurring in a system by analyzing log data of a system. The computing apparatus 10 may be configured to automate an analysis of a system error to statistically manage system vulnerability. The computing apparatus 10 may be configured to improve availability of a system by preemptively handling a system error, which is predicted in advance. The computing apparatus 10 may be applied to all computing systems generating log data including texts.

Figure 8:
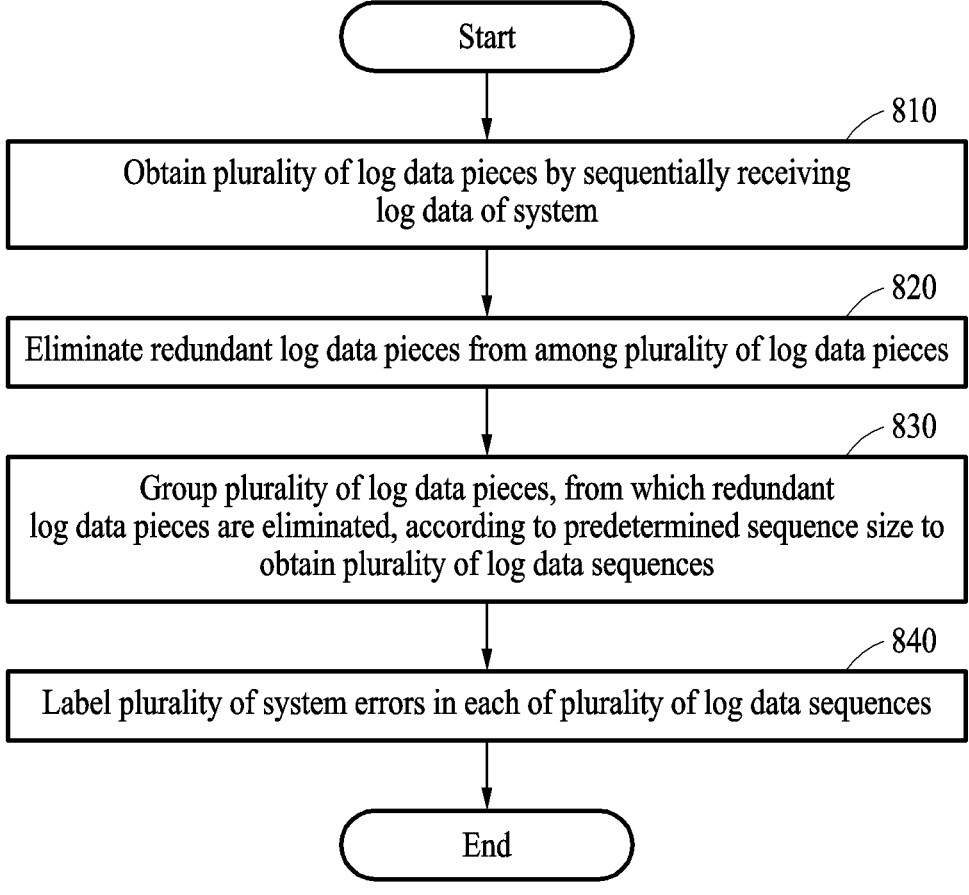
FIG. 8 illustrates an example learning method with system error prediction model training according to one or more embodiments.

FIG. 8 illustrates an example learning method of training a system error prediction model.

Referring to FIG. 8, operations 810 through 840 may be performed sequentially, but are not limited thereto. For example, two or more operations may be performed in parallel, simultaneously, or in other order that is suitable to optimize the performance of the system.

In operation 810, a processor (e.g., the processor 100 of FIG. 2) may be configured to obtain a plurality of log data pieces by sequentially receiving log data of a system. Log data may be numbers and/or text, time information, a log message, a log type, a log ID, and/or a log category value, as non-limiting examples.

In operation 820, the example processor 100 may be configured to eliminate redundant log data pieces from the plurality of log data pieces. The processor 100 may be configured to eliminate stopwords included in the plurality of log data pieces and eliminate repeating log data pieces from a plurality of log data pieces from which the stopwords are eliminated.

In operation 830, the processor 100 may be configured to group a plurality of log data pieces, from which the redundant log data pieces are removed or eliminated, according to a predetermined sequence size to obtain a plurality of log data sequences with the predetermined sequence size.

In operation 840, the processor 100 may be configured to label a plurality of system errors in each of the plurality of log data sequences. The plurality of system errors may include a plurality of system errors with different error lead times. Each of the plurality of system errors may include an error-occurrence timepoint and/or the type of system error. The processor 100 may be configured to train a neural network based on training data. The training data may be a plurality of log data sequences in which each of a plurality of system errors are labeled.

The apparatuses, processors, memories, the processor 100, the memory 200, the computing apparatus 10 described herein with respect to FIGS. 1-8 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-8 that perform the operations described in this application are performed by computing hardware, for example, by one or more processors or computers, implemented as described above implementing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, in addition to the above disclosure, the scope of the disclosure may also be defined by the claims and their equivalents, and all variations within the scope of the claims and their equivalents are to be construed as being included in the disclosure.

What is claimed is:

1. An apparatus comprising:

a processor configured to execute instructions, and a memory storing the instructions, which when executed by the processor configure the processor to:

generate a plurality of log data sequences, comprising:

generating a plurality of updated log data pieces by eliminating redundant log data pieces comprising repeated log data pieces and stopwords from a plurality of log data pieces; and generating the plurality of log data sequences by grouping the updated log data pieces according to a predetermined number of log data pieces;

generate system error prediction data using an error prediction neural network provided with one log data sequence of the plurality of log data sequences generated; and control a system based on the generated system error prediction data wherein the system error prediction data comprises information of a plurality of system errors predicted to occur at a plurality of different timepoints where the error prediction neural network output the system error prediction data for the plurality of system errors from a single log data sequence so that prediction of multiple systems errors from the single log data sequence during utilization of the error prediction neural network is enabled.

2. The apparatus of claim 1, wherein the information of the plurality of system errors comprises at least one of a predicted timepoint of error occurrence, a type of system error, and a possibility of error occurrence.

3. The apparatus of claim 1, wherein the execution of the instructions configures the processor to train the error prediction neural network based on training data in which the plurality of system errors are labeled in the single log data sequence.

4. The apparatus of claim 3, wherein the plurality of system errors comprises different error lead times.

5. The apparatus of claim 1, wherein the execution of the instructions configures the processor to generate an error handling report based on the system error prediction data.

6. The apparatus of claim 5, wherein the generating of the error handling report comprises outputting an integrated error handling report when there is a mutually associative relationship between the plurality of system errors included in the system error prediction data.

7. The apparatus of claim 5, wherein the generating of the error handling report comprises outputting a plurality of error handling reports respectively corresponding to the plurality of system errors in response to the plurality of system errors included in the system error prediction data being independent.

8. The apparatus of claim 5, wherein the generating of the error handling report comprises outputting an error prevention report in response to a possibility of an occurrence of a plurality of mutually associated system errors included in the system error prediction data being less than a threshold value.

9. The apparatus of claim 1, wherein the error prediction neural network is trained by labeling a plurality of system errors with different error lead times in the plurality of log data sequences so the prediction of multiple systems errors from the single log data sequence during utilization of the error prediction neural network is enabled.

10. The apparatus of claim 1, wherein the error prediction neural network comprises a single multi-label deep neural network (DNN) configured to output the system errors prediction data for the plurality of system errors from the single log data sequence, thereby reducing computational load during training and utilization of the neural network.

11. A processor-implemented method, comprising:

generating a plurality of updated log data pieces by eliminating redundant log data pieces from a plurality of log data pieces;

generating a plurality of log data sequences by grouping the plurality of updated log data pieces according to a predetermined number of log data pieces; and generating a trained error prediction neural network through training by labeling a plurality of system errors with different error lead times in the plurality of log data sequences; and wherein the trained error prediction neural network comprises a multi-label deep neural network (DNN) configured to output, from a single log data sequence, information of the plurality of system errors predicted to occur at a plurality of different timepoints, thereby prediction of multiple systems errors from the single log data sequence during utilization of the error prediction neural network is enabled.

12. The method of claim 11, wherein each of the labeled plurality of system errors comprises at least one of an error-occurrence timepoint and a type of system error.

13. The method of claim 11, wherein the eliminating of the redundant log data pieces comprises:

eliminating stopwords included in the plurality of log data pieces; and eliminating repeating log data pieces from a plurality of log data pieces from which the stopwords are eliminated.

14. The method of claim 11, wherein the error prediction neural network is trained by labeling a plurality of system errors with different error lead times in the plurality of log data sequences so the prediction of multiple systems errors from the single log data sequence during utilization of the error prediction neural network is enabled.

15. A computing system, comprising:

a processor configured to execute instructions, and a memory storing the instructions, which when executed by the processor configure the processor to:

generate a plurality of log data sequences, comprising:

generating a plurality of updated log data pieces by eliminating redundant log data pieces comprising repeated log data pieces and stopwords from a plurality of log data pieces; and generating the plurality of log data sequences by grouping the updated log data pieces according to a predetermined number of log data pieces;

generate system error prediction data using an error prediction neural network provided one log data sequence of the plurality of log data sequences; and control a system based on the generated system error prediction data, wherein a size of the system error prediction data changes according to a size of a log data sequence so that a number of predictable system errors changes as the size of the log data sequence changes, thereby enabling scalable error prediction adapted to system monitoring requirements,, and wherein the error prediction neural network configured to output, from the one log data sequence, the system error prediction data for a plurality of system errors occurring at a plurality of different timepoints, where prediction of multiple systems errors from a single log data sequence during utilization of the error prediction neural network is enabled, wherein the number of errors included in the system error prediction data changes according to an increase and a decrease of the number of log data pieces included in a log data sequence.

16. The system of claim 15, wherein the system error prediction data comprises information of a plurality of system errors occurring at a plurality of respective time-points.

17. The system of claim 16, wherein the information of each system error comprises at least one of a predicted timepoint of error occurrence, a type of system error, and a possibility of error occurrence.

18. The system of claim 15, wherein the generating of the plurality of log data pieces includes an elimination of redundant information in the plurality of log data pieces.

19. The system of claim 15, wherein the generating of the plurality of log data pieces includes a grouping performed with respect to some of the plurality of log data pieces.

20. The system of claim 15, wherein the error prediction neural network is trained by labeling a plurality of system errors with different error lead times in the plurality of log data sequences of varying sizes so the prediction of multiple systems errors from the single log data sequence during utilization of the error prediction neural network is enabled and the number of predictable system errors scales according to the size of the input log data sequence, thereby enabling scalable error prediction adapted to system monitoring requirements.

* * * * *